(12) United States Patent
Matsunami

(10) Patent No.: US 8,391,678 B2
(45) Date of Patent: Mar. 5, 2013

(54) PORTABLE TELEPHONE

(75) Inventor: Kanako Matsunami, Daito (JP)

(73) Assignee: Kyocera Corporation, Kyoto (JP)

( * ) Notice: Subject to any disclaimer, the term of this patent is extended or adjusted under 35 U.S.C. 154(b) by 1186 days.

(21) Appl. No.: 10/735,619

(22) Filed: Dec. 16, 2003

(65) Prior Publication Data

US 2004/0125232 A1 Jul. 1, 2004

(30) Foreign Application Priority Data

Dec. 18, 2002 (JP) ................................. 2002-366436

(51) Int. Cl.
*H04N 5/76* (2006.01)
(52) U.S. Cl. ...................................................... 386/291
(58) Field of Classification Search .................... 386/46, 386/94, 95, 83, 248, 291, 296, 298, 299, 386/362
See application file for complete search history.

(56) References Cited

U.S. PATENT DOCUMENTS

| | | | | |
|---|---|---|---|---|
| 5,761,372 A * | 6/1998 | Yoshinobu et al. | ............. | 386/83 |
| 5,825,408 A * | 10/1998 | Yuyama et al. | ............ | 348/14.01 |
| 6,233,734 B1 | 5/2001 | Macrae et al. | ................ | 725/50 |
| 6,266,481 B1 * | 7/2001 | Lee et al. | ........................ | 386/94 |
| 7,209,632 B2 * | 4/2007 | Nono | ............................. | 386/46 |
| 2002/0040477 A1 * | 4/2002 | Baese et al. | ..................... | 725/73 |
| 2002/0057350 A1 * | 5/2002 | Takei et al. | .................... | 348/231 |
| 2002/0077145 A1 | 6/2002 | Kamiya et al. | ................ | 455/550 |
| 2002/0085830 A1 | 7/2002 | Kalmar et al. | ................. | 386/46 |
| 2003/0099462 A1 * | 5/2003 | Matsugami | .................... | 386/83 |

FOREIGN PATENT DOCUMENTS

| | | |
|---|---|---|
| EP | 0 788 278 | 8/1997 |
| JP | 06-243537 | 9/1994 |
| JP | 09-018919 | 1/1997 |
| JP | 9-200707 | 7/1997 |
| JP | 10-254836 | 9/1998 |
| JP | 11-146375 | 5/1999 |
| JP | 2004-153333 | 5/2004 |

OTHER PUBLICATIONS

Mobile Multimedia—Challenges and Opportunities Stephan Hartwig, Matthias Luck, Janne Aattonen, Reza Seralat, and Wolfgang Theimer (IEEE Transactions on Consumer Electronics, vol. 46, No. 4, Nov. 2000).*
Communication from European Patent Office dated Mar. 10, 2006m, 3 pages.
Patent Abstracts of Japan, Publication No. 2002-300502; Publication date: Nov. 10, 2002; Application No. 2001-095835 (DENSO CORP); Inventor: Yamaoka Haruyasu; Title: Broadcast program recording system, broadcast program recording indicating apparatus, and broadcast program recording apparatus. *Abstract*.

* cited by examiner

*Primary Examiner* — Tat Chio
(74) *Attorney, Agent, or Firm* — Duane Morris LLP

(57) ABSTRACT

The present invention provides a portable television receiver which comprises an antenna 4 for receiving waves of television broadcast, a transmitting-receiving circuit 12 for detecting the reception condition of the waves of television broadcast before recording, a display 21, a speaker 20, and a main control circuit 14. The main control circuit 14 judges whether the recording is permitted with reference to the detected result of the reception condition of waves of television broadcast. When the recording is not permitted, the message that the recording is not permitted is shown on the display 21, and the speaker 20 produces sound.

8 Claims, 3 Drawing Sheets

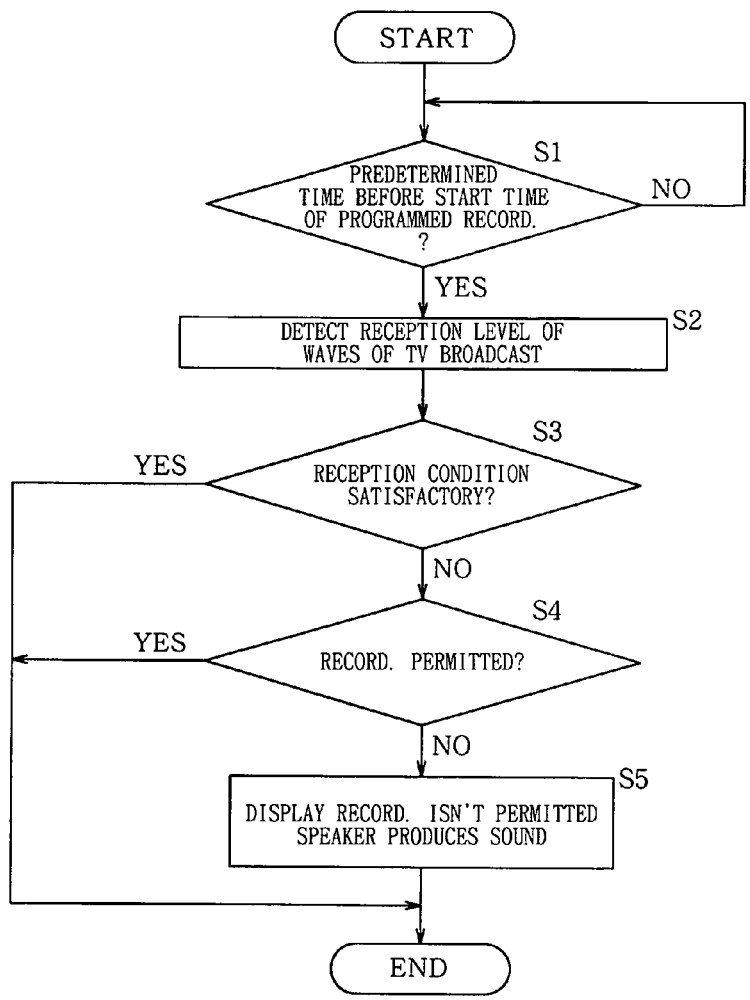

PORTABLE TELEPHONE

FIELD OF THE INVENTION

The present invention relates to portable television receivers having a recording function.

BACKGROUND OF THE INVENTION

Portable telephones have been in wide use in recent years. The portable telephones used in recent years comprise the function of showing on a display an image photographed by a CCD (Charge Coupled Device) camera and the function of showing on a display an image downloaded from a Website on the Internet in addition to the telephone communication function and e-mail communication function. The portable telephone has made its display large in size. It appears feasible that the portable telephones are given the function of watching and recording television broadcast programs.

However, the portable telephones are carried by the users, so that the location of the user may lower the reception level of the wave of television broadcast. This will make it impossible to record the television broadcast program. In the case where such a situation occurs at the time of start of recording, the user can notice that such a situation occurs if the user watches a television broadcast program. However, if the user does not watch a program, the user cannot notice that such a situation occurs. The user is therefore required to perform the manipulation for the start of watching a program and to confirm whether the recording is permitted, and thereafter to perform the manipulation for the termination of watching the program, entailing the problem of cumbersomeness of a series of manipulation for confirming whether the recording is permitted.

SUMMARY OF THE INVENTION

An object of the present invention is to provide a portable television receiver which is adapted to allow the user to notice whether the recording is permitted without performing the manipulation for confirming whether the recording is permitted even if the user does not watch a television broadcast program.

The present invention provides a portable television receiver comprising:
receiving means for receiving waves of television broadcast,
receiving state detection means for detecting receiving state of the wave of television broadcast before recording,
judging means for judging whether the recording is permitted based on a detected result of the receiving state detection means, and
notifying means for notifying the user that such a situation that the recording is not permitted occurs when it is judged that the recording is not permitted.

With the portable television receiver of the present invention, the receiving state detection means detects the receiving state of the wave of television broadcast before recording, for example, at the time of depressing a recording start key or at a predetermined time before the start time of programmed recording, and the judging means judges whether the recording is permitted based on the detected result. When it is judged that the recording is not permitted, the user is notified that such a situation that the recording is not permitted occurs, for example, by showing on a display that the recording is not permitted or by sound. Accordingly, it is automatically judged whether the recording is permitted at the time of depressing the recording start key or at the predetermined time before the start time of programmed recording. If the recording is not permitted, the user is notified that such a situation occurs. The user can therefore notice whether the recording is permitted without performing the manipulation for confirming whether the recording is permitted.

Stated specifically, the receiving state detection means executes the detection operation at the predetermined time before the start time of programmed recording.

According to the specific construction described, the user sets the start time of programmed recording in advance, and then the receiving state detection operation and the judging operation as described will be executed at the predetermined time before the start time of programmed recording, for example, five minutes before the start time. In the case where it is judged that the recording is not permitted, the user is notified that such a situation occurs. Consequently the user can notice that such a situation that the recording is not permitted occurs without performing the manipulation at the predetermined time before the start time of programmed recording.

Stated specifically, the receiving state detection means repeats the detection operation. The judging means repeats the judging operation. The notifying means repeats the notifying operation until it is judged that the recording is permitted or until the user cancels programmed recording.

According to the above specific construction, the notifying operation will be repeated until the user moves to the place wherein the wave of television broadcast is received in a satisfactory condition or until the user cancels the programmed recording after noticing that such a situation that the recording is not permitted occurs.

As described above, the portable television receiver of the present invention allows the user to notice whether the recording is permitted without performing the manipulation for confirming whether the recording is permitted even if the user does not watch the television broadcast program.

BRIEF DESCRIPTION OF THE DRAWINGS

FIG. 3 is a flowchart showing a procedure to be performed by a main control circuit at the time of programming recording.

DETAILED DESCRIPTION OF EMBODIMENTS

An embodiment of the present invention will be described below in detail with reference to the drawings.

Figure 1:
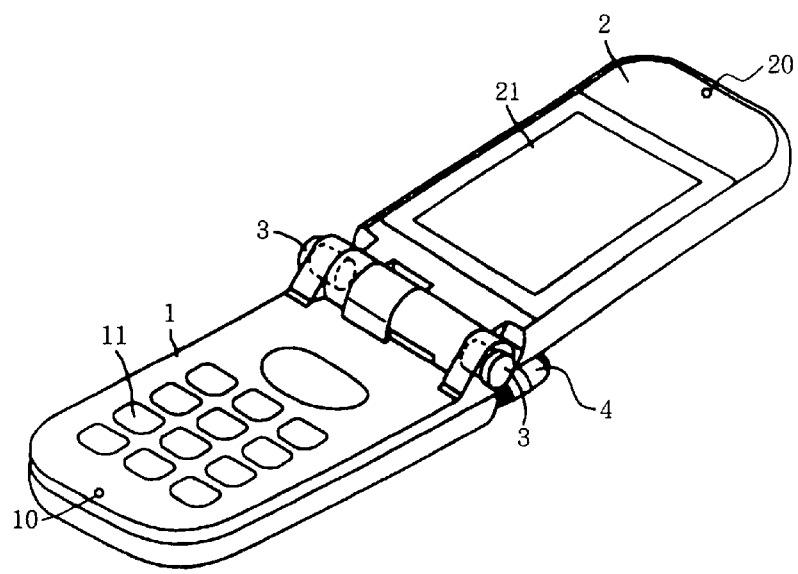
FIG. 1 is a perspective view of a portable telephone according to the present invention.

With reference to FIG. 1, the portable telephone of the present invention comprises a main body 1 having arranged thereon a plurality of manipulation keys 11 and a closure 2 having a display 21 arranged thereon. An upper end of the main body 1 is connected to a lower end of the closure 2 by a hinge mechanism 3. The closure 2 is openable and closable to the main body 1.

The portable telephone has the function of watching and recording a television broadcast program. The main body 1 has provided on a head thereof an antenna 4 for receiving radio waves from the base station and waves of television broadcasts. While the main body 1 has a microphone 10 provided on a lower end thereof, the closure 2 has a speaker 20 provided on an upper end thereof. Opening the closure 2 enables the user to make a phone call and watch a television broadcast program.

Figure 2:
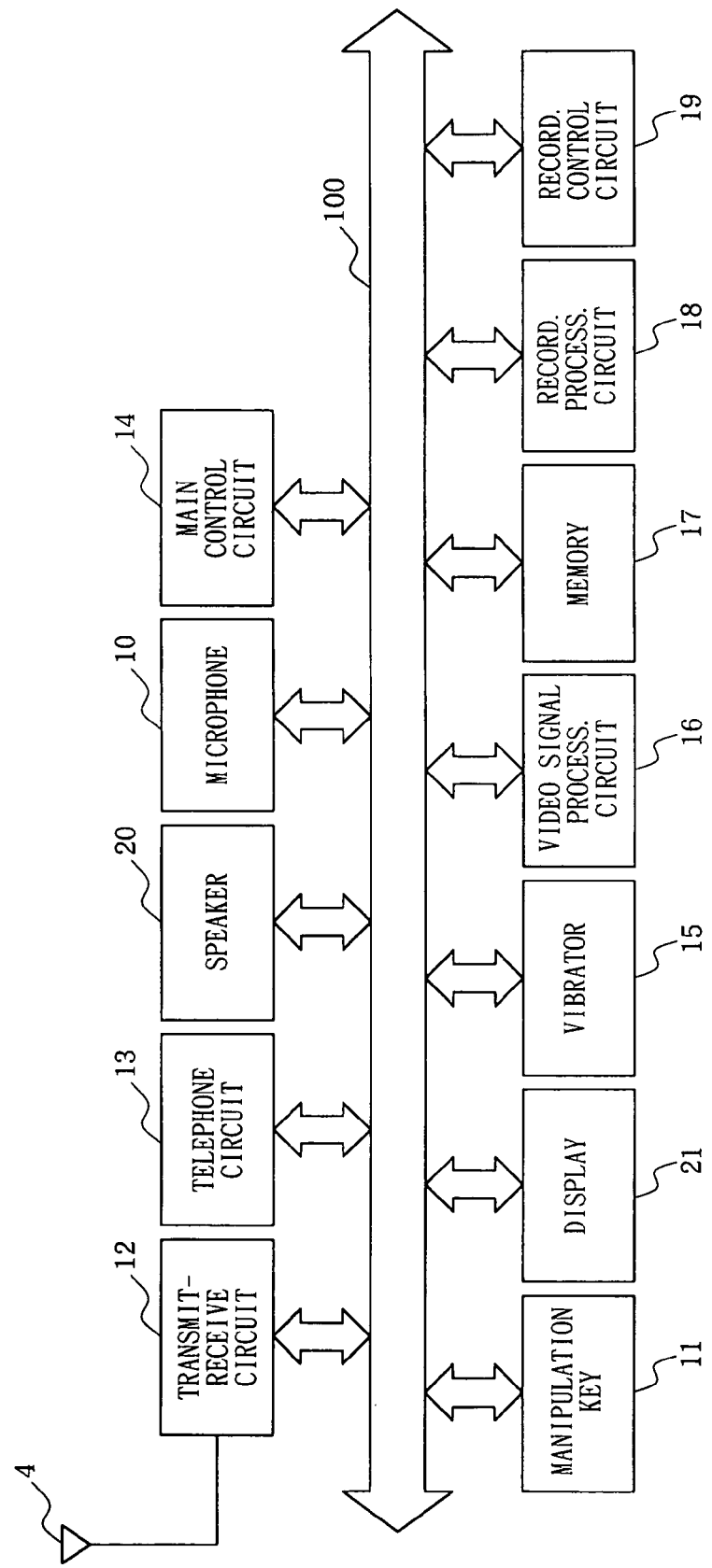
FIG. 2 is a block diagram showing the electrical structure of the portable telephone.

FIG. 2 shows the electrical structure of the portable telephone described. The radio wave received by the antenna 4 is fed via a transmitting-receiving circuit 12 to a telephone circuit 13 which will then demodulate a speech reception signal. The speech reception signal is fed to the speaker 20 and is output as voice. A speech transmission signal produced by a microphone 10 is fed to the telephone circuit 13 and modulated. The modulated speech transmission signal is transmitted via the transmitting-receiving circuit 12 from the antenna 4.

Connected through a bus 100 to a main control circuit 14 are the transmitting-receiving circuit 12, the telephone circuit 13, the speaker 20, and the microphone 10. The main control circuit 14 controls operation. Connected to the bus 100 are the manipulation keys 11, a display 21, and a vibrator 15 for notifying the user of an incoming call.

Further the bus 100 has connected thereto a video signal processing circuit 16. Waves of television broadcast received by the antenna 4 are fed, via the transmitting-receiving circuit 12, to the video signal processing circuit 16 which will prepare video signals in a predetermined format and feed the video signal to the display 21. As a result, the video image of the television broadcast program is shown on the display 21.

Connected to the bus 100 are a memory 17 having stored therein information of programmed recording and video data, a recording processing circuit 18 for converting the video signal obtained from the video signal processing circuit 16 to digital data and storing the digital data in the memory 17 to perform recording operation, and a recording control circuit 19 for controlling the recording operation with reference to the information of programmed recording stored in the memory 17.

With the portable telephone of the present invention, it is judged whether the recording is permitted based on the reception level of the television broadcast wave at a predetermined time before the start time of programmed recording, for example, five minutes before the programmed time. When the recording is not permitted, the user is notified that such a situation that the recording is not permitted occurs.

FIG. 3 shows a procedure to be performed by the main control circuit 14 when the recording is programmed. An incorporated memory of the main control circuit 14 has stored therein a first threshold value required for judging whether the reception condition of the television broadcast wave is satisfactory and a second threshold value required for judging whether the recording is permitted and which is less than the first threshold value.

When the information of programmed recording is set, step S1 inquires whether the notification is received from the recording control circuit 19 that it is a predetermined time before the start time of programmed recording. If the inquiry is answered in the negative, step S1 follows again to repeat the same inquiry. Thereafter when said notification is received from the recording control circuit 19 at the time of a predetermined time before the start time of programmed recording, the answer for step S1 is affirmative, followed by step S2 wherein the transmitting-receiving circuit 12 is commanded to detect the reception level of the television broadcast wave. As a result the reception level of the television broadcast wave is detected by the transmitting-receiving circuit 12, and the detected result is fed to the main control circuit 14.

Subsequently in step S3 an inquiry is made as to whether the reception condition of the television broadcast wave is satisfactory with reference to the reception level detected and the first threshold value. In the case where the detected reception level is greater than the first threshold value, the reception condition is satisfactory, to thereby terminate the procedure.

In the case where the detected reception level is less than the first threshold value, the reception condition is not satisfactory, followed by step S4 wherein an inquiry is made as to whether the recording is permitted with reference to the reception level detected and the second threshold value. When the detected reception level is greater than the second threshold value, the recording is permitted to thereby terminate the procedure.

On the other hand, when the reception level detected is less than the second threshold value, the recording is not permitted, followed by step S5 wherein the message that the recording is not permitted is shown on the display 21 for a specified period of time, and the speaker 20 produces sound for a specified period of time to terminate the procedure.

With the portable telephone of the present invention, it is automatically judged whether the recording is permitted with reference to the reception level of the television broadcast wave at a predetermined time before the start time of programmed recording. When the recording is not permitted, the message that the recording is not permitted is shown on the display 21, and the speaker 20 produces sound to allow the user to notice the message. Therefore the user can notice that such a situation that the recording is not permitted occurs without performing the manipulation, even if the user does not watch the television broadcast program. Thereafter when the user moves to the place wherein the wave of television broadcast is received in a satisfactory condition, the program to be recorded by programming can be recorded.

The embodiment described above is intended to illustrate the present invention and should not be construed as restricting the invention defined in the appended claims or reducing the scope thereof. Further the devices of the invention are not limited to those of the foregoing embodiment in construction but can of course be modified variously without departing from the spirit of the invention as set forth in the claims.

For example, according to the embodiment described, when the recording is not permitted, the speaker 20 produces sound, but the vibrator 15 can be brought into operation instead of the speaker.

Furthermore, the message that the recording is not permitted is repeatedly displayed and the speaker 20 repeatedly produces sound until the reception condition of the television broadcast wave becomes satisfactory to permit the recording, or until the programmed recording is cancelled.

What is claimed is:

1. A portable telephone capable of receiving television and programmed recording, comprising:
a receiver configured to receive waves of a television broadcast;
a receiving state detector configured to detect a receiving state of the waves of television broadcast before recording;
a memory storing programmed recording information;
a detector configured to detect that it is at a time point preceding a set start time of the programmed recording based on the programmed recording information stored in the memory;
a receiving state detection activator configured to activate the receiving state detector automatically without operation by a user, at a predetermined amount of time earlier than the set start time of the programmed recording, so that the receiving state detector detects the receiving state for at least a portion of the predetermined amount of time preceding the set start time of the programmed recording;

a judger configured to judge whether the recording is permitted based on a detected result of the receiving state detector; and a notifier configured to notify the user that the recording is not permitted, if it is judged that the recording is not permitted, wherein the receiving state comprises the reception level of the television broadcast waves, the notifier performs notification by showing on a display a message that the recording is not permitted, the receiving state detector repeats the detection operation after being activated by the receiving state detection activator, unless the recording is judged to be at least one of satisfactory or permitted, the judger repeats the judging operation, and the notifier repeats the notifying operation until it is judged that the recording is permitted.

2. The portable telephone of claim 1, wherein the receiving state detection activator is configured to discontinue the receiving state detector at a time preceding the set start time of the programmed recording.

3. A portable telephone capable of receiving television and programmed recording, comprising:

a receiver configured to receive waves of a television broadcast;

a receiving state detector configured to detect a receiving state of the waves of television broadcast before recording;

a memory storing programmed recording information;

a detector configured to detect that it is at a time point preceding a set start time of the programmed recording based on the programmed recording information stored in the memory;

a receiving state detection activator configured to activate the receiving state detector automatically without operation by a user, at a predetermined amount of time earlier than the set start time of the programmed recording, so that the receiving state detector detects the receiving state for at least a portion of the predetermined amount of time preceding the set start time of the programmed recording;

a judger configured to judge whether the recording is permitted based on a detected result of the receiving state detector; and a notifier configured to notify the user that the recording is not permitted, if it is judged that the recording is not permitted, wherein the receiving state comprises the reception level of the television broadcast waves, the receiving state detector discontinues the detection operation if the recording is judged to be at least one of satisfactory or permitted, the notifier performs notification by showing on a display a message that the recording is not permitted, and the notifier performs notification by a production of at least one of sound and vibration.

4. The portable telephone of claim 3, wherein the receiving state detection activator is configured to discontinue the receiving state detector at a time preceding the set start time of the programmed recording.

5. A method, comprising:

receiving waves of a television broadcast on a receiver;

detecting a receiving state of the waves of the television broadcast before recording;

storing programmed recording information;

detecting that it is at a time point preceding a set start time of a programmed recording based on the programmed recording information;

activating the detecting the receiving state automatically without operation by a user, at a predetermined amount of time earlier than the set start time of the programmed recording, so that the receiving state is detected for at least a portion of the predetermined amount of time preceding the set start time of the programmed recording;

judging whether the recording is permitted based on a detected result of the detecting the receiving state; and notifying the user that the recording is not permitted, if it is judged that the recording is not permitted, wherein the receiving state comprises a reception level of the television broadcast waves, the notifying comprises displaying a message that the recording is not permitted, the detecting the receiving state is repeated after being activated, unless the recording is judged to be at least one of satisfactory or permitted, the judging is repeated, and the notifying is repeated until it is judged that the recording is permitted.

6. The method of claim 5, wherein activating the detecting the receiving state further comprises discontinuing the detecting the receiving state at a time preceding the set start time of the programmed recording.

7. A method, comprising:

receiving waves of a television broadcast on a receiver;

detecting a receiving state of the waves of the television broadcast before recording;

storing programmed recording information;

detecting that it is at a time point preceding a set start time of a programmed recording based on the programmed recording information;

activating the detecting the receiving state automatically without operation by a user, at a predetermined amount of time earlier than the set start time of the programmed recording, so that the receiving state is detected for at least a portion of the predetermined amount of time preceding the set start time of the programmed recording;

judging whether the recording is permitted based on a detected result of the detecting the receiving state; and notifying the user that the recording is not permitted, if it is judged that the recording is not permitted, wherein the detecting the receiving state is discontinued if the recording is judged to be at least one of satisfactory or permitted, the receiving state comprises a reception level of the television broadcast waves, the notifying comprises displaying a message that the recording is not permitted, and producing at least one of sound and vibration.

8. The method of claim 7, wherein activating the detecting the receiving state further comprises discontinuing the detecting the receiving state at a time preceding the set start time of the programmed recording.

* * * * *